Sept. 16, 1947.  W. H. DE LANCEY  2,427,552
LIQUID MEASURING AND DISPENSING APPARATUS
Filed Nov. 11, 1944  5 Sheets-Sheet 1
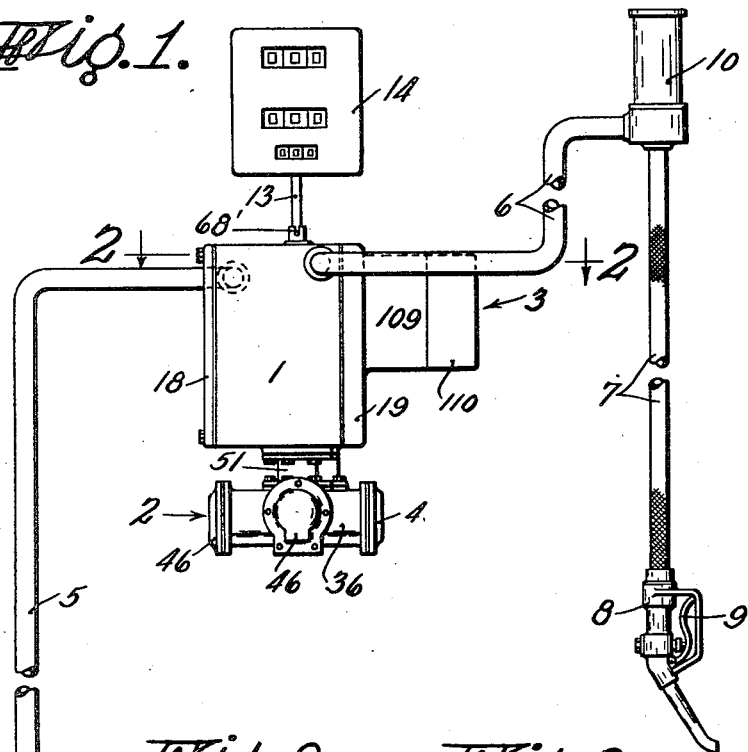
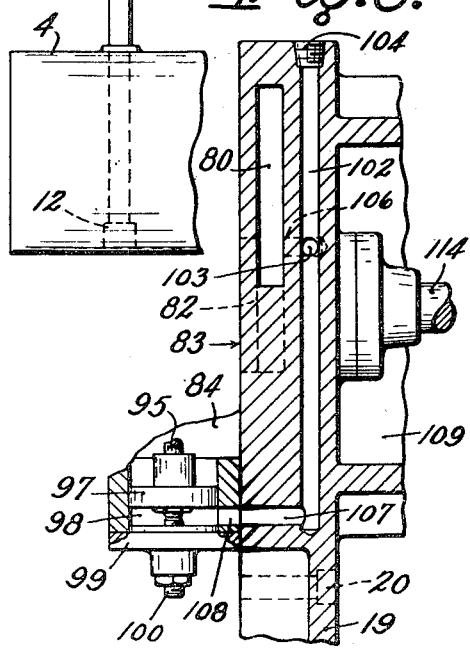
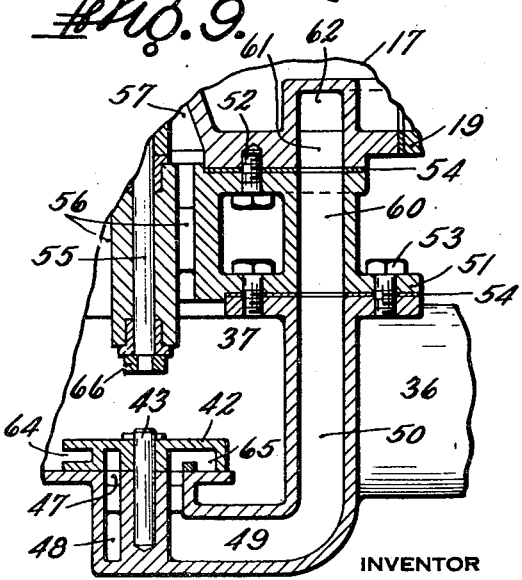
INVENTOR
WARREN H. DE LANCEY
BY Chapin & Neal
ATTORNEYS Sept. 16, 1947.   W. H. DE LANCEY   2,427,552
LIQUID MEASURING AND DISPENSING APPARATUS
Filed Nov. 11, 1944   5 Sheets-Sheet 2
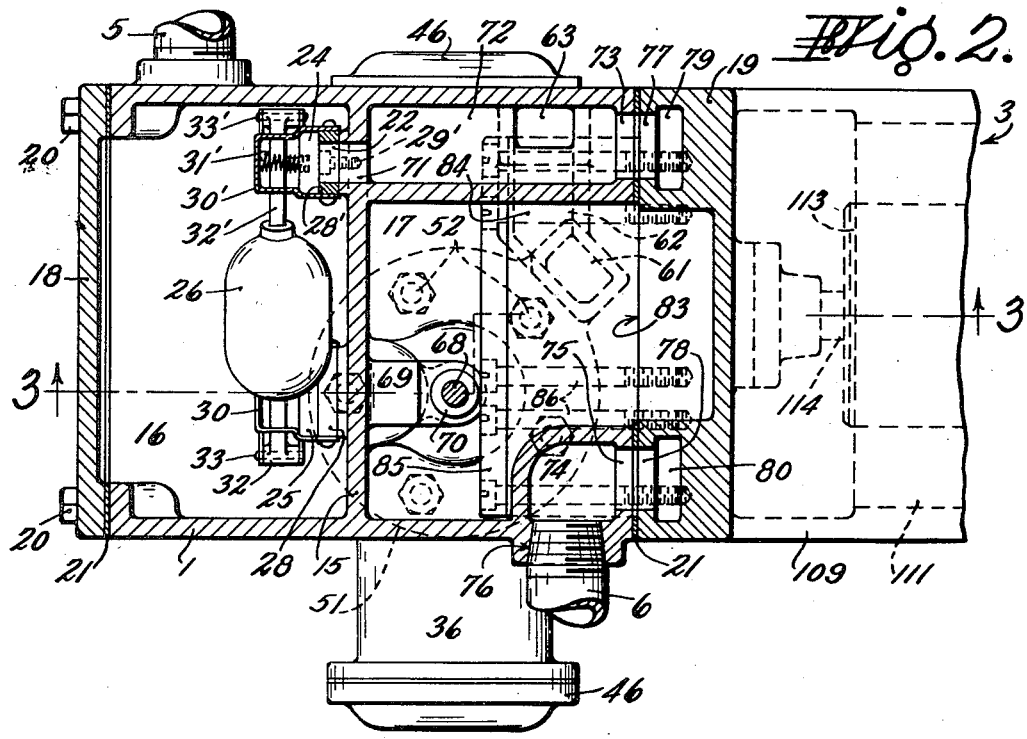
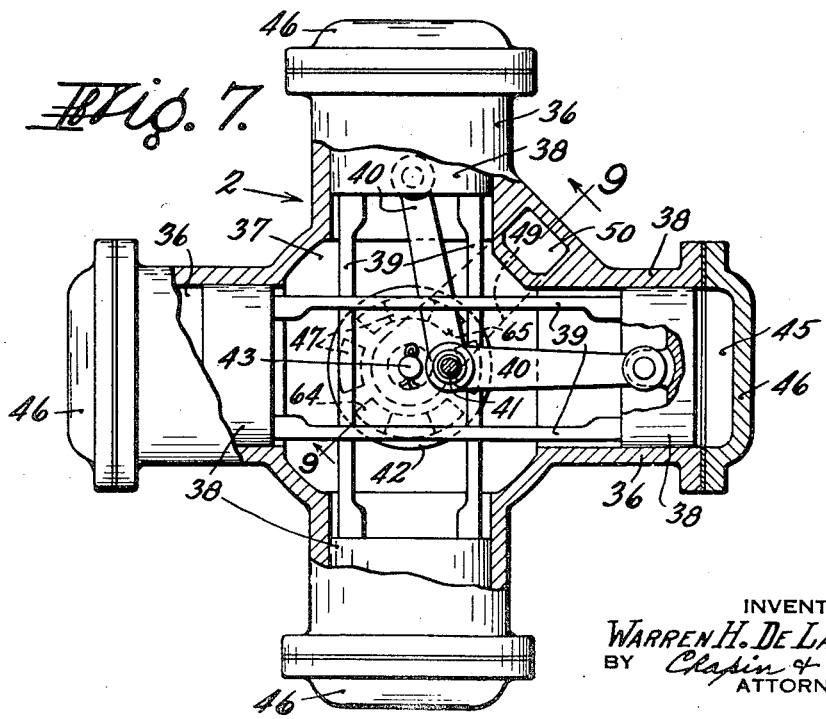
INVENTOR
WARREN H. DE LANCEY
BY Claflin & Neal
ATTORNEYS

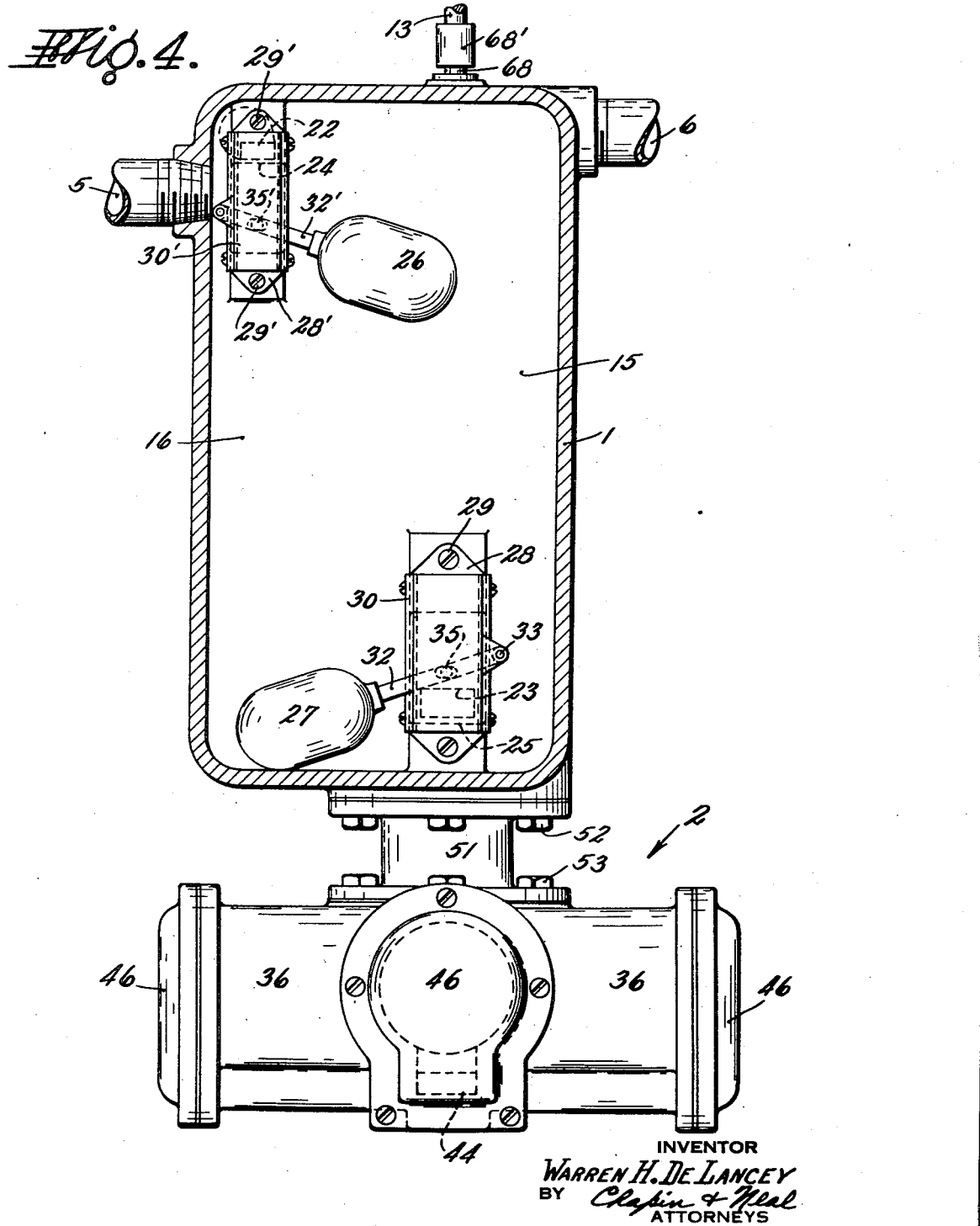

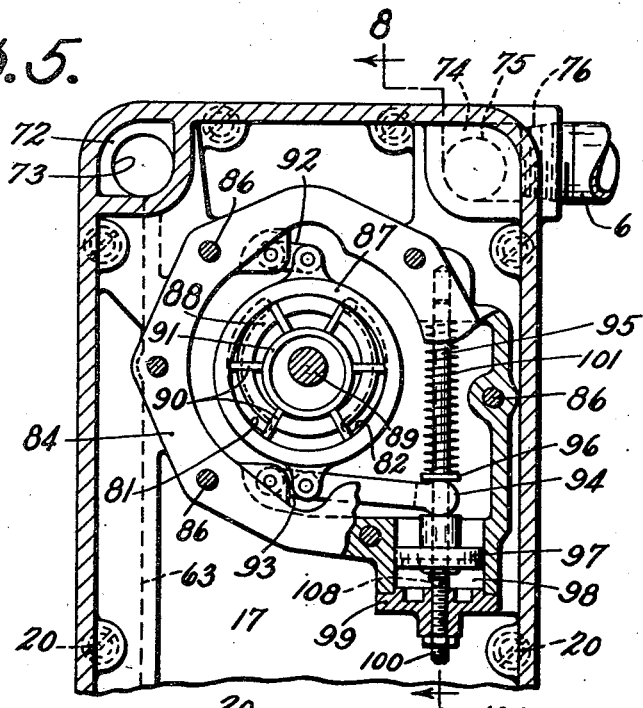
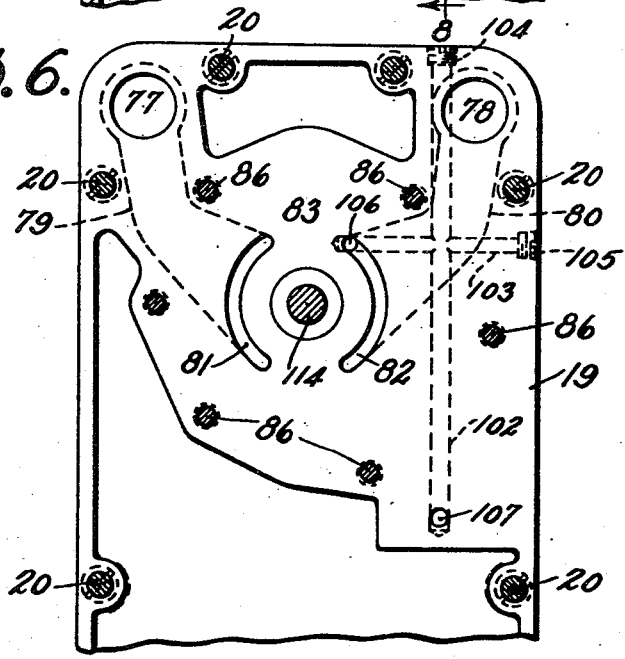

Patented Sept. 16, 1947

2,427,552

UNITED STATES PATENT OFFICE 2,427,552

LIQUID MEASURING AND DISPENSING APPARATUS

Warren H. De Lancey, Springfield, Mass., assignor to Gilbert & Barker Manufacturing Company, West Springfield, Mass., a corporation of Massachusetts Application November 11, 1944, Serial No. 562,979

6 Claims. (Cl. 222—72)

1

This invention relates to improvements in liquid measuring and dispensing apparatus, particularly adapted for use at service stations in dispensing measured quantities of gasoline and the like.

The invention has for its general object the provision of an apparatus of the class described in which separation of air from the liquid is affected under the favorable condition of partial vacuum and in which a single pump is arranged to scavenge the air from the separator, whenever required, and to draw the air-free liquid through the meter and force it out through the dispensing hose.

The invention has for a further object, the provision in apparatus of the class described of a single pump of the variable-capacity type for the dual purpose of scavenging the separator and dispensing the liquid.

A further object of the invention is to provide in an apparatus of the class described a separator having upper and lower outlets for air and liquid respectively, a pump having its suction side connected to both said outlets and its pressure side connected to the dispensing hose—a meter interposed in the connection from the lower outlet to the pump, and means preventing passage of air from the lower outlet and the passage of liquid from the upper outlet, whereby the one pump may draw air from the separator and force it into the hose without passing through the meter and may draw liquid from the separator through the meter and force it through the hose.

The invention will be disclosed with reference to the accompanying drawings in which Fig. 1 is a diagrammatical view of a liquid measuring and dispensing apparatus embodying the invention;

Fig. 2 is a sectional plan view taken on the line 2—2 of Fig. 1 showing the separator and pumping unit;

Figure 3:
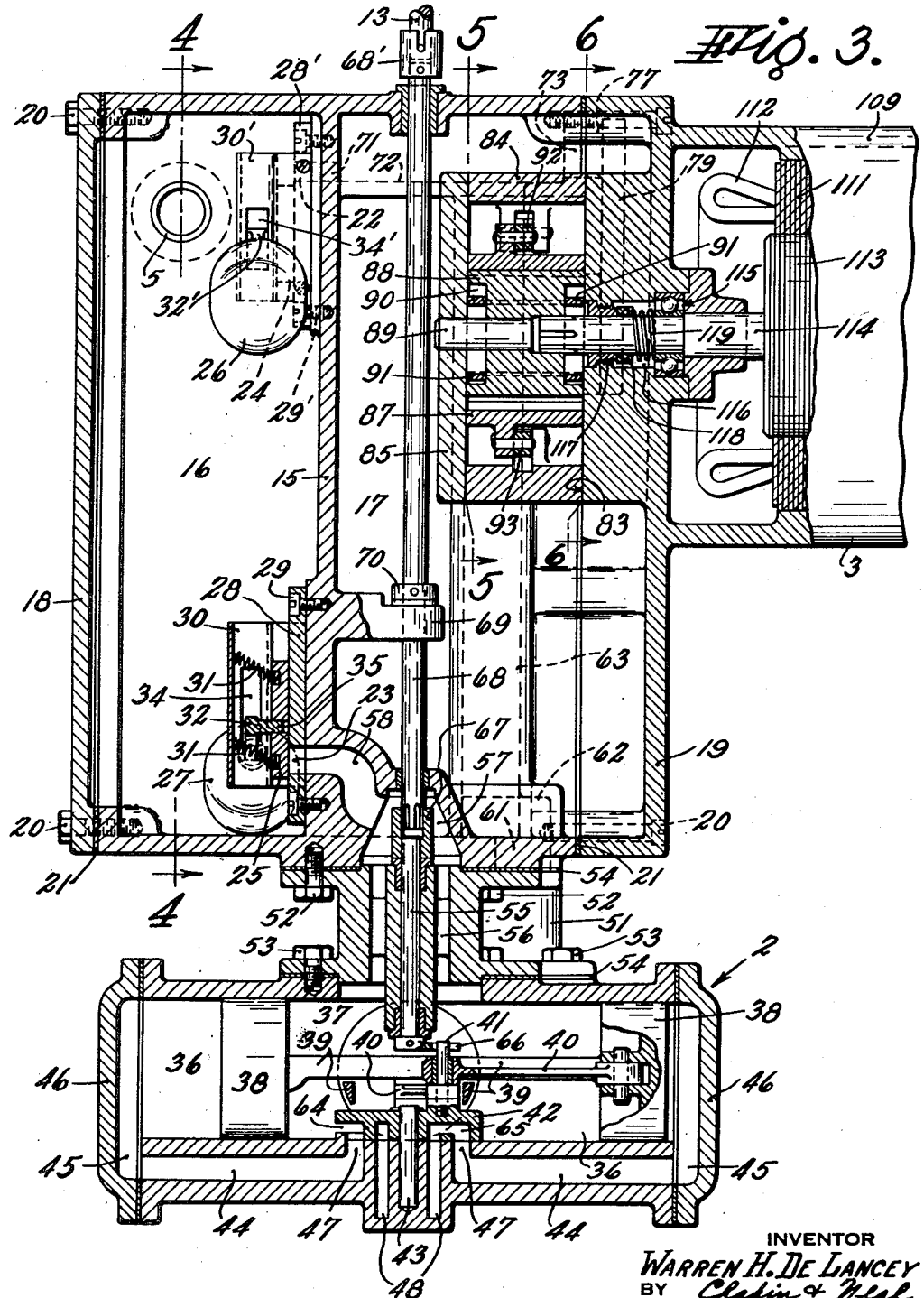
Fig. 3 is a sectional elevational view taken on the line 3—3 of Fig. 2.

Figs. 4, 5 and 6 are cross sectional views taken on the lines 4—4, 5—5, and 6—6 respectively, of Fig. 3;

Fig. 7 is a plan view, partly in section of the meter;

Fig. 8 is a fragmentary sectional view taken on the line 8—8 of Fig. 5; and

Fig. 9 is a fragmentary sectional view taken on the line 9—9 of Fig. 7.

Referring to these drawings and first to Fig. 1 thereof, the apparatus includes a casing 1, which has within it an air separating chamber, a pump,

2 and control valves and which has mounted on it a suitable meter 2 and a motor 3 for driving the pump. Gasoline from an underground storage tank 4 is drawn up by the pump through a suction pipe 5 into the air separating chamber and thence through meter 2 into the discharge piping, which includes fixed piping 6 and a flexible hose 7. The hose 7 has at its delivery end a nozzle 8, having a self-closing valve which may be manually opened by the lever 9. A suitable visible-discharge indicator 10 may be interposed between the piping 6 and hose 7, as indicated. The suction pipe 5 is provided with the usual foot valve, indicated 12. The meter drives by means including the shaft 13 a suitable register such as 14, which may, as indicated, show the quantity and cost of the gasoline dispensed.

Referring next to Figs. 2 and 3, the casing 1 is divided by a vertical partition 15 into an air separating chamber 16 and a pump chamber 17. The two walls 18 and 19 which parallel partition 15 are made removable as covers and are suitably held to the casing, as by screws 20—gaskets, such as 21, being interposed one between each cover and the casing to make the joints liquid tight. The separating chamber 16 (Figs. 3 and 4) has a single inlet to which the upper end of pipe 5 is connected and two outlets 22 and 23 arranged, respectively, near the top and near the bottom of the chamber. The lower outlet 23 is connected to the meter 2 and thence to the pump while the upper outlet 22 is connected directly to the pump, as will later be described in detail.

These outlets 22 and 23 are controlled by valves 24 and 25, respectively, which are actuated, as by floats 26 and 27, in response to variations in the level of gasoline in chamber 16. The lower valve 25 opens in response to rise of liquid above a predetermined level in the separator and closes when the liquid falls to said level. Such level is above the top of outlet 23. Valve 25 is thus arranged to prevent the passage of air through outlet 23 and into the meter 2. The valve 24 closes in response to rise of liquid above a predetermined level and opens when liquid falls to or below such level. Such level is below the bottom of outlet 22. Valve 24 thus allows the passage of air from the separator but prevents the passage of gasoline.

Each of the valves 24 and 25 is, or may be, constructed in the same general manner and a description of one will suffice for both. The lower valve 25 only will be described in detail and parts of the upper valve 24 which correspond to parts of the lower valve will be given the same reference numerals with the addition of a prime. The valve 25 is a slide valve, being reciprocable in a vertical plane over a seat 28, suitably fixed, as by screws 29, to partition 15 and containing the outlet port 23. The valve may be of carbon and the seat of chrome-plated metal to enable relative sliding movement with relatively little friction. A metal frame 30, substantially U-shape in cross sectional shape, has its lower side edges secured as indicated to the sides of seat 28 and provides a guide for the valve. Springs 31, engaged at one end with spring seats on the cross wall of guide 30 and at the other end in recesses in the valve, serve to press the valve against its seat. The float lever 32 is pivoted at one end at 33 to frame 30 and passes through slots 34 one in each of the side walls thereof. These slots serve to limit the swinging movement of the float lever. The lever 32 is provided with a lateral extension 35 which fits into a recess in the valve—whereby the valve may be raised and lowered as the float rises and falls.

The meter 2 may be of any suitable type. As shown in Fig. 7, by way of illustrative example, it is of the positive-displacement type, having a plurality of radial cylinders 36 radiating from a central chamber 37. Pistons 38, one in each cylinder, are interconnected in opposed pairs by pairs of bars 39. The two pairs of bars 39 are at different levels to avoid interference (see also Fig. 3), and one piston of each pair is connected by a rod 40 to a crankpin 41, fixed eccentrically to the top of a valve 42. The latter is rotatably mounted on a stud 43 fixed in the bottom wall of chamber 37. Cored in the bottom walls of the cylinders (Fig. 3) are longitudinal passages 44, one for each cylinder, each leading from the clearance space 45 in a cylinder head 46 to a port 47 in the bottom wall of chamber 37. Surrounding the stud 43 is a central and more or less annular discharge passage 48 which empties into a radial passage 49 and a communicating vertical passage 50, all such passages being cored in the body of the meter. The meter body is secured to the bottom of the casing 1 by means of a flanged coupling 51 and cap screws 52 and 53, respectively passing through the upper and lower flanges of the coupling and threading into the bottom wall of casing 1 and the top wall of meter 2. Gaskets 54 seal the joints and render the connection liquid tight. This coupling 51 has a central bearing for a shaft 55 and around this bearing are passages 56 which connect the conical chamber 57, above described, to the inlet chamber 37. A passage 58 connects chamber 57 to the lower outlet 23. The coupling 51 also has a vertical passage 60 (Fig. 9) which connects the meter outlet passage 50 to a port 61 and a communicating horizontal passage 62 (Figs. 2 and 3), both formed in the bottom wall of chamber 17. A passage 63 formed in a vertical wall of chamber 17 connects passage 62 to the suction side of the pump.

The valve 42 has suitable ports, such as an inlet port 64 (Figs. 3 and 7), for connecting the inlet chamber 37 to a port 47 for one cylinder 36, and an outlet port 65 for connecting at the same time the port 47 of the opposed cylinder 36 to the discharge passage 48. The liquid entering chamber 37 is distributed successively to the cylinders 36 to so move the pistons 38 as to rotate the valve 42 continuously in one direction. The movement of the pistons is made to actuate the shaft 55 by means of a crank 66 (Fig. 3) fixed to the lower end thereof and having a forked end to receive the crankpin 41. The shaft 55 has fixed to its upper end a coupling 67, which lies within the chamber 57. Engaged with this coupling is a shaft 68 which extends vertically upward through the chamber 17 and through the top wall thereof and has fixed to its upper end a coupling 68' to connect with the register driving shaft 13, above described. Shaft 68 is supported in suitable bearings, one in the top wall of chamber 17 and one in a lug 69 on partition 15. A collar 70 on shaft 68 engages the upper end face of the bearing in lug 69 to take care of the end thrust.

The upper outlet 22 of the separator (Fig. 2) connects through a port 71 in partition 15 with the inner end of a cored passage 72 which is formed in one upper corner of the pump chamber 17 (see also Fig. 5) and extends to the outer face thereof, terminating with a circular port 73 for connection to the pump. The passage 63 connects with this passage 72. In the other upper corner of chamber 17 (Figs. 2 and 5) is a second cored passage 74 which has at one end a circular port 75 for connection to the pump and at the other end a tapped opening 76 for connection to the pipe 6, above described.

The cover 19 (Fig. 6) has formed therein circular inlet and outlet ports 77 and 78 which register with the ports 73 and 75, respectively. Connecting with the ports 77 and 78 are cored passages 79 and 80 which extend downwardly in the cover and communicate with the main inlet and outlet ports 81 and 82, respectively, which open through a finished base wall 83. The pump includes a hollow outer casing 84 (Figs. 3 and 5) and an inner wall or cover 85 (Fig. 3), which are secured as by the screws 86 to the base wall 83, which forms the outer wall of the pump. Mounted in the space within casing 84 is the pump proper which consists of a stator 87 of hollow cylindrical form and a cylindrical rotor 88, which is rotatably mounted on a stud 89 fixed at one end to cover 85. The rotor is provided with a circular series of angularly-spaced radial slots to slidably receive, one in each radially slidable blades 90. Each end face of the rotor is recessed to receive an annular ring 91. The two rings 91 serve to hold the outer edges of the blades 90 in contact with the inner peripheral surface of the stator 87. The rotor, stator and blades are substantially equal in length to the casing 84 and slide freely over the finished face 83 and the finished inner face of cover 85.

The pump is of the variable-capacity type and its stator may be moved in response to pump outlet pressure to shift the stator from the illustrated position of maximum eccentricity relative to rotor 88 to various other positions of less eccentricity and also into concentric relation with the rotor. To effect this result, the stator is pivotally connected by links 92 and 93 to the wall of casing 84. The link 93 extends beyond the rotor and terminates with a fork 94 which straddles a rod 95 and lies between a collar 96 and the hub of a piston 97, both hub and collar being fixed to the rod. The piston 97 is slidably mounted in a cylinder 98 formed in the casing 84 and having a separable head 99 in which is mounted a screw 100 forming an adjustable abutment to limit the downwardly movement of the piston. The rod 95 is slidably mounted at its upper end in a hole in casing 84. A spring 101, coiled around rod 95 acts between a wall of casing 84 and collar 96 with a tendency to hold the piston 97 against stop 100 and the stator 87 in its position of maximum eccentricity and maximum pumping capacity. The outer end of the cylinder 98 is connected to the outlet port 82 of the pump in the following manner. Two intersecting holes 102 and 103 (Fig. 6) are drilled in the cover 19 from the top wall and from one side wall thereof and these holes lie between the outlet port 80 and the outer face of the cover as shown in Fig. 8. The outer ends of holes 102 and 103 (Fig. 6) are closed by plugs 104 and 105, respectively. The hole 103 extends inwardly as far as the pump discharge port 82 and is connected thereto by a drilled hole 106. The hole 102 extends downwardly as far as the lower end of cylinder 98 and is connected thereto by holes 107 and 108, respectively (Fig. 8), drilled in cover 19 and in the base of the cylinder 98. Thus, liquid from the pump outlet port can enter the cylinder 98 and act on the piston in opposition to spring 101.

The motor 3, as herein shown includes a shell 109 (Figs. 1 and 3) formed integrally with cover 19, which serves in part as one end plate of the motor. The other end plate 110 is a removable one, as indicated in Fig. 1. The stator laminations of the motor (Fig. 3) are shown in part at 111 and the stator winding is shown in part at 112. The rotor 113 has a shaft 114 located coaxially of the pump rotor and mounted in suitable bearings, including a ball bearing 115 fixed in the outer port of a recess 116 in cover 19. In the other end of this recess is a bushing 117 having a finished end face which is engaged by a suitable seal ring 118 on shaft 114. A spring 119, coiled around this shaft, presses the seal ring against said face of the bushing 117. The inner end of shaft 114 has a splined engagement with the pump rotor so as to drive the same and yet enable the pump to be removed in a direction axially of the shaft without removing the rotor 113 or its shaft 114.

In the initial operation of the apparatus, the motor 3 is started and the pump placed in operation. The upper outlet valve 24 will be open and the lower valve 25 initially will be closed. The valve of nozzle 8 will be held open. The pump will then operate at its maximum pumping rate and exhaust the air from suction pipe 5 and then from separator chamber 16. The pump is of large enough size so that this operation may be quickly accomplished. As soon as liquid has been drawn up pipe 5 and into chamber 16 to a level above the lower outlet port 23, float 27 will have risen sufficiently to open valve 25. The pump will then act to draw first air and then liquid through the meter eventually filling the discharge conduit with liquid, whereupon the valve of nozzle 8 will be closed. Closure of the nozzle valve is followed by a rise in pressure in the discharge conduit and the pressure acting on piston 97, shifts the pump stator 87 into nearly concentric relation with the rotor, whereby to reduce the rate of pumping and avoid the expenditure of power for doing unnecessary work. The pump will do only so much work as is necessary to overcome the slippage in the pump and will operate at a very low rate. As soon as the motor 3 is stopped, the pressure will gradually fall and, as it falls, the pump rotor will be shifted to increase its capacity.

In normal operation, the pump will usually be in a position of maximum pumping capacity at the time when the motor 3 is started. The discharge conduit including hose 7 and pipe 6, the pump, the meter and the intervening passages as well as the passage between the lower separator outlet 23 will normally be filled with liquid and the separator 16 itself will normally be filled at least up to the level of inlet pipe 6. Valve 25 will be open. If there is air in the chamber 16 above pipe 6, the valve 24 will also be open. If, however, the separator is filled with liquid up to the desired predetermined level the valve 24 will be closed. If now, the motor 3 is started, the pump will start coincidentally therewith but until the valve of nozzle 8 is opened, no fluid, either liquid or gaseous, can be pumped through the hose. Accordingly pressure will be built up in the discharge conduit and the pump stator 87 will be shifted to its position of minimum pumping capacity, whereby very little power will be consumed because very little work is being done. However, as soon as the valve of nozzle 8 is fully opened, the pressure will drop and the pump stator will be shifted into its position of maximum pumping capacity. Liquid will immediately be drawn through the meter and forced out of the hose. If there is too much air in the separator, then the pump will also draw out air and discharge it into the hose with the gasoline but the air stream will not go through the meter and be measured. As soon as enough of the air is drawn out of separator 16, the valve 24 will close and continued action of the pump will then be devoted exclusively to pumping liquid. As soon as the desired quantity of liquid has been dispensed, the operator closes the valve of nozzle 8 and the pump stator is then shifted by the rising pressure to its position of minimum pumping capacity. The pump continues to work at this low rate until the motor 3 is stopped but little power is consumed because little work is done.

The invention thus offers a liquid dispensing and measuring apparatus, wherein the separation of air from liquid can be effected efficiently under the favorable condition of partial vacuum; wherein one pump serves the two purposes of priming the apparatus or scavenging the separator and also dispensing liquid; wherein power consumption is kept low by the arrangement for the one pump to work at varying rates according to the need; and wherein a pump of large capacity to secure quick priming and scavenging as well as speedy delivery of liquid can be used because of the arrangement for it to work at very low rates when substantially no pumping is required. The one pump works only when needed and at such rate as is needed. The pump will pump air only when that is what is necessary. At other times it may pump liquid only. And at still other times it may pump both air and liquid but the air will be by-passed around the meter and not measured even though it is mixed with the gasoline and discharged through the hose. The valves 24 and 25 predetermine whether the pump will pump air or liquid or a mixture of the two and the pressure in the discharge conduit controls the rate of pumping.

I claim:

1. Liquid measuring and dispensing apparatus, comprising, a container having an inlet adapted for connection to a liquid supply tank and upper and lower outlets, a single pump having its inlet connected to both of said outlets, a meter interposed in the connection from the pump to the lower outlet, a valve for closing the lower outlet to prevent flow of air therethrough and opening by the rise in level of liquid above said outlet, and a valve for the upper outlet open to discharge air and closing by the rise in liquid level in said chamber to a level adjacent the upper outlet.

2. Liquid measuring and dispensing apparatus, comprising, a container having an inlet adapted for connection to a liquid supply tank and upper and lower outlets, a single pump having its inlet connected to both of said outlets, a meter interposed in the connection from the pump to the lower outlet, a valve for closing the lower outlet to prevent flow of air therethrough and opening by the rise in level of liquid above said outlet, a valve for the upper outlet open to discharge air and closing by the rise in liquid level in said chamber to a level adjacent the upper outlet, and separate floats in said chamber for actuating said valves.

3. Liquid measuring and dispensing apparatus, comprising, a container having an inlet adapted for connection to a liquid supply tank and upper and lower outlets, a single variable-capacity pump having its inlet connected to both of said outlets, a meter interposed in the connection from the pump to the lower outlet, a valve for closing the lower outlet to prevent flow of air therethrough and opening by the rise in level of liquid above said outlet, and a valve for the upper outlet open to discharge air and closing by the rise in liquid level in said chamber to a level adjacent the upper outlet.

4. Liquid measuring and dispensing apparatus, comprising, a pump, an air separator located on the suction side of said pump and having an inlet for connection to a low-level supply tank and having two outlets arranged one near the top and one near the bottom of the separator, a conduit connecting the upper outlet to the inlet of said pump, a meter, a conduit connecting the lower outlet to the inlet of said meter, a conduit connecting the outlet of said meter to the inlet of said pump, a discharge conduit for said pump, means controlling the flow from said lower outlet and automatically opening to permit the passage of liquid and closing to prevent the passage of air, and means for controlling the flow from said upper outlet and automatically opening to permit the passage of air and closing to prevent the passage of liquid.

5. Liquid measuring and dispensing apparatus, comprising, a single positively-acting pump, an air separator located on the suction side of said pump and having an inlet for connection to a low-level supply tank and having two outlets arranged one near the top and one near the bottom of the separator, a conduit connecting the upper outlet to the inlet of said pump, a meter, a conduit connecting the lower outlet to the inlet of said meter, a conduit connecting the outlet of said meter to the inlet of said pump, a discharge conduit for said pump, means controlling the flow from said lower outlet and automatically opening to permit the passage of liquid and closing to prevent the passage of air, and means for controlling the flow from said upper outlet and automatically opening to permit the passage of air and closing to prevent the passage of liquid.

6. Liquid measuring and dispensing apparatus, comprising, a single positively-acting pump having means movable to vary its pumping rate, an air separator located on the suction side of said pump and having an inlet for connection to a low-level supply tank and having two outlets arranged one near the top and one near the bottom of the separator, a conduit connecting the upper outlet to the inlet of said pump, a meter, a conduit connecting the lower outlet to the inlet of said meter, a conduit connecting the outlet of said meter to the inlet of said pump, a discharge conduit for said pump, means controlling the flow from said lower outlet and automatically opening to permit the passage of liquid and closing to prevent the passage of air, means for controlling the flow from said upper outlet and automatically opening to permit the passage of air and closing to prevent the passage of liquid, and means responsive to the pressure in the discharge conduit for operating the first-named means whereby the pumping rate decreases as the pressure rises and increases as the pressure falls.

WARREN H. DE LANCEY.

REFERENCES CITED

The following references are of record in the file of this patent:

UNITED STATES PATENTS

| Number | Name | Date |
|---|---|---|
| 2,292,007 | Morgan | Aug. 4, 1942 |
| 2,330,634 | Shoemaker | Sept. 28, 1943 |